(12) United States Patent
Ji et al.

(10) Patent No.: US 11,921,003 B2
(45) Date of Patent: Mar. 5, 2024

(54) TESTING DEVICE FOR PRECISION RETAINING ABILITY AND FATIGUE LIFE OF RV REDUCER

(71) Applicant: BEIJING UNIVERSITY OF TECHNOLOGY, Beijing (CN)

(72) Inventors: Shuting Ji, Beijing (CN); Yueming Zhang, Beijing (CN); Weihao Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/835,914

(22) Filed: Jun. 8, 2022

(65) Prior Publication Data
US 2022/0299403 A1     Sep. 22, 2022

Related U.S. Application Data
(63) Continuation of application No. PCT/CN2021/121983, filed on Sep. 30, 2021.

(30) Foreign Application Priority Data
Nov. 20, 2020   (CN) .......................... 202011304281.1

(51) Int. Cl.
*G01M 13/04*     (2019.01)
*G01M 13/027*     (2019.01)

(52) U.S. Cl.
CPC ................................ *G01M 13/027* (2013.01)

(58) Field of Classification Search
CPC ................................................. G01M 13/027
See application file for complete search history.

(56) References Cited

U.S. PATENT DOCUMENTS 11,346,645 B2 *   5/2022   Ji .......................... G01M 13/04
2019/0323814 A1 *   10/2019   Ji ............................. G01B 5/08

FOREIGN PATENT DOCUMENTS

| CN | 101441477 A | 5/2009 |
| CN | 102808749 A | 12/2012 |

(Continued)

OTHER PUBLICATIONS

Search Report of CN202011304281.1.
(Continued)

*Primary Examiner* — Freddie Kirkland, III
(74) *Attorney, Agent, or Firm* — J.C. PATENTS

(57) ABSTRACT

The invention relates to a device for testing the precision retaining ability and fatigue life of RV reducer. The device includes a workbench, a mounting bracket base, a upper pressure plate for the mounting bracket, a servo motor, a mounting fixed sleeve, a tested RV reducer, a temperature sensor, an extension arm, a simulated swing arm, two counterweight blocks named the first and second counterweight block, the first displacement sensor, a sensor holder, a sensor protector, a detection rod, and the second displacement sensor. The device is equipped with two counterweight blocks at the end of the simulated swing arm to simultaneously provide variable loaded torque and loaded bending moment to the RV reducer. The first displacement sensor is placed under the counterweight block to measure the positioning accuracy and repeat positioning accuracy of RV reducer. The second displacement sensor is placed under the detection rod to measure the bending stiffness of RV reducer. After running for a specified time, the precision retaining ability, fatigue life and wear rule of RV reducer are tested. The invention provides an experimental basis for theoretical research on the wear rule and accelerated life of RV reducer.

4 Claims, 3 Drawing Sheets

(56) References Cited

FOREIGN PATENT DOCUMENTS

| CN | 203258029 U | 10/2013 |
|---|---|---|
| CN | 108287072 A | 7/2018 |
| CN | 108871763 A | 11/2018 |
| CN | 109357867 A | 2/2019 |
| CN | 109443757 A | 3/2019 |
| CN | 109443765 A | 3/2019 |
| CN | 209624050 U | 11/2019 |
| CN | 111307447 A | 6/2020 |
| CN | 111678663 A | 9/2020 |
| CN | 112504670 A | 3/2021 |
| KR | 20100000548 A | 1/2010 |
| KR | 102079644 B1 | 4/2020 |
| WO | WO2019219160 A1 | 11/2019 |

OTHER PUBLICATIONS

International Search Report of PCT/CN2021/121983.
NPL1: "Life Calculation and Accelerated Life Test of RV Reducer", Machinery Design & Manufacture, No. 8, Aug. 31, 2020, pp. 270-274.
NPL2: "Design and Experiment of Fatigue Loading System for Full Scale Wind Turbine Blade", Mechanical Science and Technology for Aerospace Engineering, vol. 35, No. 8, Aug. 31, 2016, pp. 1227-1232.

\* cited by examiner

TESTING DEVICE FOR PRECISION RETAINING ABILITY AND FATIGUE LIFE OF RV REDUCER

CROSS REFERENCE TO RELATED APPLICATION

This application is a continuation application of International application number PCT/CN2021/121983, filed on Sep. 30, 2021, entitled "A Testing Device for Precision Retaining Ability and Fatigue Life of RV Reducer", which claims the priority benefit of Chinese Patent Application No. 202011304281.1, filed on Nov. 20, 2020, the above identified applications are hereby incorporated by reference in its entirety.

TECHNICAL FIELD

The invention relates to a device and method for testing the positioning accuracy, bending stiffness and fatigue life of Rotate Vector (RV) reducer. It is characterized in that the precision retaining ability and bending stiffness of RV reducer can be tested at the same time, belonging to the field of industrial robots.

BACKGROUND

RV reducer is a key functional component of industrial robot joints. The key performance indicators of RV reducer are precision retaining ability, stiffness and fatigue life. The development of the testing device for precision retaining ability and fatigue life of RV reducer is the basis for the theoretical research of fatigue life. Therefore, the development of this testing device is of great significance to improve the precision retaining ability, stiffness and fatigue life of RV reducer.

During the operation of the industrial robot, the RV reducer bears both the loaded torque and the loaded bending moment. The existing loading method of the fatigue life testing device for RV reducer can only provide the loaded torque or loaded bending moment separately. It cannot provide loaded torque and loaded bending moment simultaneously. Therefore, in order to systematically study the fatigue life of RV reducer under real operating conditions, a fatigue life testing device for RV reducer that can simultaneously provide both loaded torque and loaded bending moment is required.

Precision retaining ability is a key indicator to evaluate the quality of RV reducer, but there is no testing platform that can measure the precision retaining ability of RV reducer. In order to meet the actual working needs of RV reducer, the testing platform is demanded to measure the positioning accuracy and repeat positioning accuracy of the RV reducer at the same time, and ensure that the RV reducer bears both the loaded torque and loaded bending moment simultaneously. In addition, the bending stiffness is another important indicator to evaluate the performance of RV reducer. It is highly demanded to develop a testing device and method to simulate the actual working conditions of the RV reducer applied in the industrial robot, and to measure the bending stiffness and wear of the RV reducer during the whole life cycle.

Under rated working conditions, the fatigue life of RV reducer is generally 6000 hours. In order to shorten the test time and obtain reliable test data without changing the failure mechanism and failure mode, it is necessary to adopt a more severe condition than normal working condition to accelerate the failure of RV reducer. It is necessary to develop an accelerated life testing device and method of RV reducer, where the speed and loaded conditions can be increased at any time.

SUMMARY

The purpose of the invention is to develop a device and method for measuring the positioning accuracy, bending stiffness and fatigue life of RV reducer. In order to meet the actual working conditions of RV reducer, a testing device that can simultaneously provide loaded torque and loaded bending moment is developed. The development of this testing device is to measure the positioning accuracy, repeat positioning accuracy and bending stiffness of RV reducer in real time, to analyze the wear rule of RV reducer in its whole life cycle, to measure the fatigue life of RV reducer, and to study the accelerated fatigue life of RV reducer. The invention provides reliable measuring means and methods for the precision retaining ability, stiffness and fatigue life of RV reducer.

A testing device for precision retaining ability and fatigue life of RV reducer, characterized in that: it includes a workbench (1), a mounting bracket base (2), a upper pressure plate of the mounting bracket (3), a servo motor (4), a mounting fixed sleeve (5), a tested RV reducer (6), a temperature sensor (7), an extension arm (8), a simulated swing arm (9), two counterweight blocks named the first counterweight block (10) and the second counterweight block (10'), the first displacement sensor (11), a sensor holder (12), a sensor protector (13), a detection rod (14) and the second displacement sensor (15).

The mounting fixed sleeve (5) is used to fix the RV reducer (6) and the servo motor (4). There are threaded holes on both sides of the mounting fixed sleeve (5). One side of the mounting fixed sleeve (5) is connected with the servo motor (4), and the other side of the mounting fixed sleeve (5) is connected with the pin wheel housing of the RV reducer (6). There is a through hole in the middle of the mounting fixed sleeve (5). The output shaft of the servo motor (4) penetrates through the through hole, and is connected with the input shaft of the RV reducer (6) through key joint. In the testing process, different models of RV reducers can be tested by replacing different mounting fixed sleeves (5).

The mounting bracket base (2) is fixed on the workbench (1) by bolts. The mounting bracket base (2) is connected with the upper pressure plate of the mounting bracket (3) to form the mounting bracket. The mounting fixed sleeve (5) is installed inside the mounting bracket with an interference fit. Both the upper pressure plate of the mounting bracket (3) and the mounting fixed sleeve (5) are processed with positioning holes. The upper pressure plate of the mounting bracket (3) and the mounting fixed sleeve (5) are fastened by bolts through the positioning holes, thus the servo motor (4) and the RV reducer (6) can be installed on the same bracket.

The output planet carrier of the RV reducer (6) is fixedly connected with the extension arm (8) through bolts, and ensure that the axis of the extension arm (8) is collinear with the rotation axis of the output planet carrier of the RV reducer (6). The extension arm (8) is arranged vertically with the simulated swing arm (9), and is fixedly connected through bolts. The servo motor (4) drives the RV reducer (6) to rotate, and the output planet carrier of the RV reducer (6) drives the extension arm (8) and the simulated swing arm (9) to swing back and forth. The end of the simulated swing arm (9) is equipped with two counterweight blocks named the first counterweight block (10) and the second counterweight block (10'). The first counterweight block (10) and the second counterweight block (10') are respectively placed on two sides of the simulated swing arm (9). The first counterweight block (10) and the second counterweight block (10') swing back and forth with the simulated swing arm (9) to simultaneously provide variable loaded torque and loaded bending moment to the RV reducer (6).

The first displacement sensor (11) is placed below the first counterweight block (10), and the sensor protector (13) is placed below the second counterweight block (10') to protect the first displacement sensor (11). During the measuring process, the first counterweight block (10) swings back and forth with the simulated swing arm (9). The first displacement sensor (11) is used to measure the position of the first counterweight block (10) when it swings to the lowest point. During the entire life cycle of the RV reducer (6), the positioning accuracy, repeat positioning accuracy and wear of the RV reducer (6) are detected in real time. Then the numerical fitting algorithm is used to determine the precision retaining ability and fatigue life of the RV reducer (6).

On the side away from the RV reducer (6), the detection rod (14) is fixedly connected with the extension arm (8), and ensure that the axis of the extension arm (8) is collinear with the axis of the detection rod (14). The second displacement sensor (15) is placed below the detection rod (14) to measure the height of the detection rod (14). Then the tilt angle of the output planet carrier of the RV reducer (6) under different rotational positions and different loads can be determined. After the specified time of operation, the bending stiffness of the RV reducer (6) and the wear in the tilt direction are measured in real time. Then, the wear rule of the RV reducer (6) along the tilt direction can be studied.

The loaded torque and loaded bending moment can be increased by adding the weight of the two counterweight blocks (10 and 10'). By adding their weight or increasing the working speed of the servo motor (4), the wear of each part of the RV reducer (6) can be accelerated. Thus, the precision retaining ability and fatigue life of the RV reducer can be tested under more severe conditions. The temperature sensor (7) is fixed on the pin wheel housing of the RV reducer (6) to measure the operating temperature of the RV reducer. Thus, the feasibility of the test conditions and the effectiveness of the test data are confirmed.

The advantages of the invention are as follows:

(1) The invention provides a testing device for the precision retaining ability and fatigue life of the RV reducer, which can simultaneously provide loaded torque and loaded bending moment during the operation of the RV reducer. In addition, the loaded torque varies with different rotational angular positions of the output planet carrier. It can meet the actual working conditions of RV reducers in industrial robots. This method is more convenient, fast and practical, and provides manufacturers with a device and method for measuring the positioning accuracy, bending stiffness and fatigue life of the RV reducer.

(2) Under the conditions of providing loaded bending moment and without providing loaded bending moment to RV reducer, the position of the detection rod is collected respectively. Thus, the tilt angle and bending stiffness of the output planet carrier of RV reducer can be quickly determined by comparing the height of the detection rod under different conditions. The invention can measure the tilt angle of the output planet carrier of the RV reducer at different rotational angular positions in real time during the operation of the RV reducer. The invention can also improve the measurement accuracy by increasing the axial distance of the displacement sensor along the output shaft.

(3) The invention provides a comprehensive testing method in actual working conditions. It can not only test the positioning accuracy and repeat positioning accuracy of the RV reducer, but also test the real-time tilt angle and bending stiffness during the operation of the RV reducer. In addition, the invention can test the precision retaining ability of the RV reducer, and the wear rule along the tilt direction and the swing direction.

(4) The loaded torque and loaded bending moment can be increased by adding the weight of the two counterweight blocks. The invention can simultaneously add their weight and increase the working speed of the servo motor to carry out the accelerated fatigue life test of the RV reducer. In order to facilitate the replacement of different models of RV reducer for testing, the mounting fixed sleeve is designed, which can install the servo motor and the RV reducer on the same bracket. At the same time, the output shaft of the motor is directly connected with the input shaft of the RV reducer through key joint. It effectively reduces the installation space of the servo motor and the RV reducer. Therefore, the invention can meet the real working conditions of RV reducer and can adjust the test conditions conveniently and quickly.

(5) The invention has the advantages of convenient installation, simple structure, quick adjustment of test conditions, conforming with actual working conditions, and strong applicability of various types of precision reducers for performance test and fatigue life test.

Figure 2:
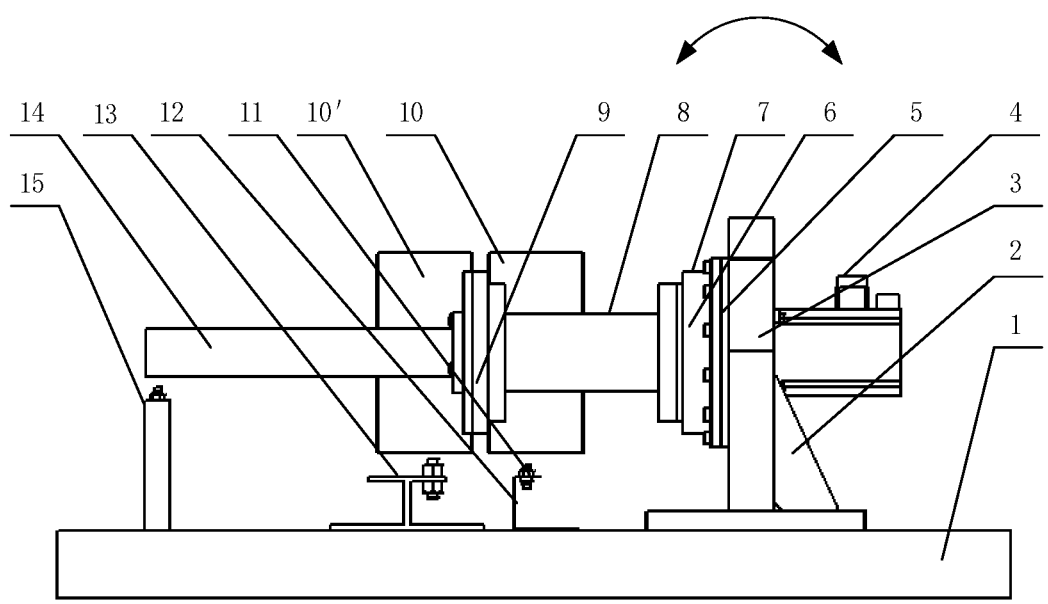
FIG. 2 is the second view of testing device for precision retaining ability and fatigue life of RV reducer.

The meanings of the symbols in the accompanying drawings are as follows: a workbench 1, a mounting bracket base 2, a upper pressure plate of the mounting bracket 3, a servo motor 4, a mounting fixed sleeve 5, a tested RV reducer, a temperature sensor 7, an extension arm 8, a simulated swing arm 9, two counterweight blocks named the first counterweight block 10 and the second counterweight block 10', the first displacement sensor 11, a sensor holder 12, a sensor protector 13, a detection rod 14, and the second displacement sensor 15. The arc arrow shown in FIG. 2 represents the tilt direction of the RV reducer.

DETAILED DESCRIPTION OF THE IMPLEMENTATION

The following is a further detailed description of the working principle and detection method of the testing device based on the composition and assembly diagram of the testing device.

Figure 1:
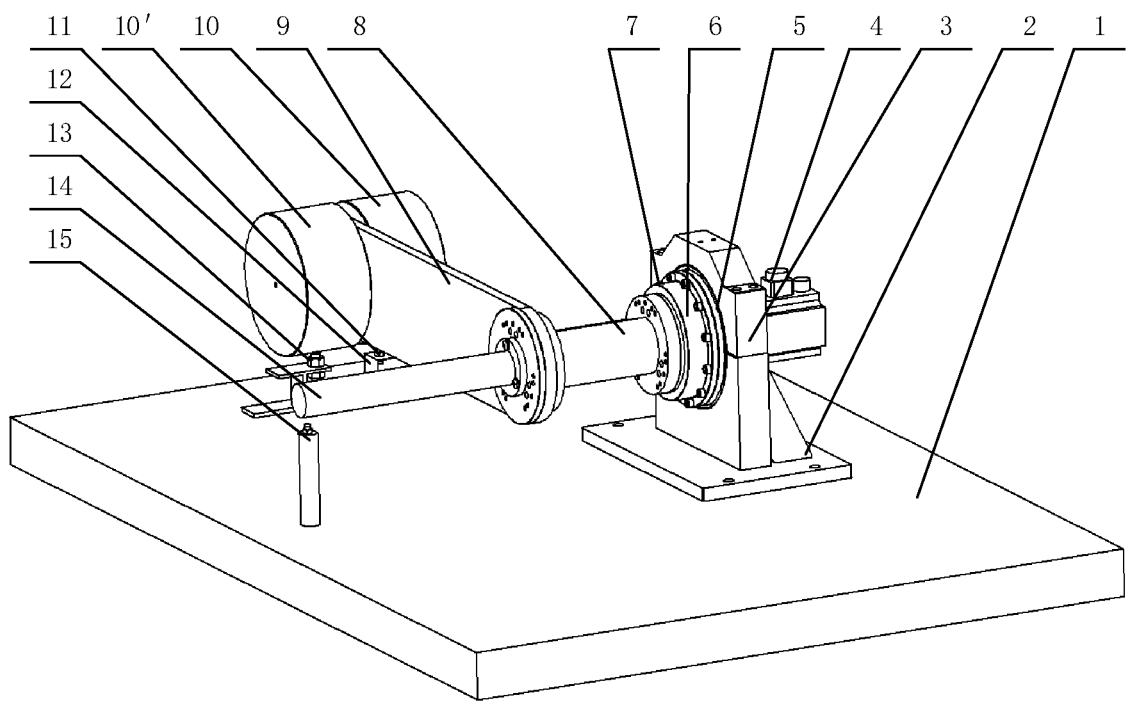
FIG. 1 is the first view of testing device for precision retaining ability and fatigue life of RV reducer.

The purpose of the invention is to develop a device and method for simultaneously testing the positioning accuracy, bending stiffness and fatigue life of RV reducer. As shown in FIG. 1 and FIG. 2, this device includes a workbench (1), a mounting bracket base (2), a upper pressure plate of the mounting bracket (3), a servo motor (4), a mounting fixed sleeve (5), a tested RV reducer (6), a temperature sensor (7), an extension arm (8), a simulated swing arm (9), two counterweight blocks named the first counterweight block (10) and the second counterweight block (10'), the first displacement sensor (11), a sensor holder (12), a sensor protector (13), a detection rod (14), and the second displacement sensor (15).

The mounting bracket base (2) is fixed on the workbench (1) by bolts. The mounting bracket base (2) is connected with the upper pressure plate of the mounting bracket (3) to form the mounting bracket. The mounting fixed sleeve (5) is installed inside the mounting bracket with an interference fit. The upper pressure plate of the mounting bracket (3) and the mounting fixed sleeve (5) are processed with positioning holes. The upper pressure plate of the mounting bracket (3) and the mounting fixed sleeve (5) are fastened by bolts through the positioning holes.

Figure 3:
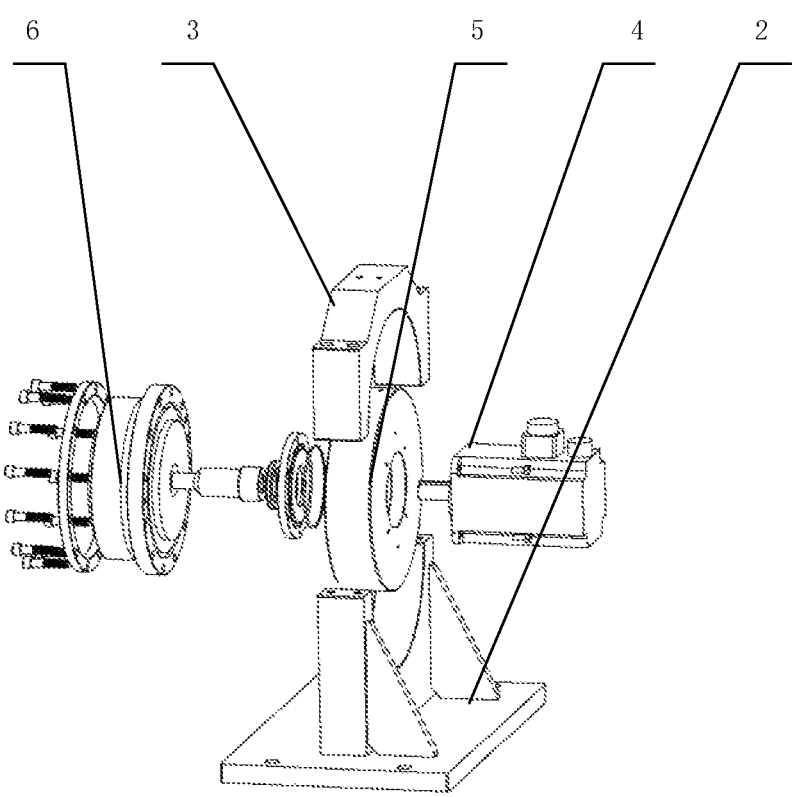
FIG. 3 is the exploded view of the mounting bracket and the mounting fixed sleeve.

As shown in FIG. 3, the RV reducer (6) and the servo motor (4) can be installed on the same bracket by applying the mounting fixed sleeve (5), rather than two brackets in the traditional arrangement. There are threaded holes on both sides of the mounting fixed sleeve (5). One side of the mounting fixed sleeve (5) is connected with the servo motor (4), and the other side of the mounting fixed sleeve (5) is connected with the pin wheel housing of the RV reducer (6). There is a through hole in the middle of the mounting fixed sleeve (5). The output shaft of the servo motor (4) penetrates through the through hole, and is connected with the input shaft of the RV reducer (6) through key joint. In this way, the axis deviation and precision loss caused by the traditional connection method-coupling connection can be avoided. This connection mode also reduces the installation space of the motor and the reducer. In the testing process, different models of RV reducers can be tested by replacing different mounting fixed sleeves (5). Therefore, the invention is convenient to replace different types of test specimens.

The output planet carrier of the RV reducer (6) is fixedly connected with the extension arm (8) through bolts, and ensure that the axis of the extension arm (8) is collinear with the rotation axis of the output planet carrier of the RV reducer (6). The extension arm (8) is arranged vertically with the simulated swing arm (9), and is fixedly connected through bolts. The end of the simulated swing arm (9) is equipped with two counterweight blocks named the first counterweight block (10) and the second counterweight block (10'). The first counterweight block (10) and the second counterweight block (10') are respectively placed on two sides of the simulated swing arm (9). On the side away from the RV reducer (6), the detection rod (14) is fixedly connected with the extension arm (8), and ensure that the axis of the extension arm (8) is collinear with the axis of the detection rod (14).

During the working process, the servo motor (4) drives the RV reducer (6) to rotate. The output planet carrier of the RV reducer (6) drives the extension arm (8), the simulated swing arm (9), and the detection rod (14) to swing back and forth with 180 degrees in both directions. The first counterweight block (10) and the second counterweight block (10') swing back and forth with the simulated swing arm (9) to simultaneously provide loaded torque and loaded bending moment to the RV reducer (6). The loaded torque varies with the rotational position of the output planet carrier of the RV reducer. Therefore, the loading method of the invention conforms with the actual working conditions of RV reducers in industrial robot. By adding the weight of the first counterweight block (10) and the second counterweight block (10'), the loaded torque and loaded bending moment of the RV reducer (6) can be increased. It has the advantages of simple structure, convenient operation and space saving.

The first displacement sensor (11) is placed under the first counterweight block (10), and the sensor protector (13) is placed under the second counterweight block (10'). In order to protect the first displacement sensor (11), the height of the sensor protector (13) should be higher than the first displacement sensor (11) by adjusting the bolt height. During the reciprocating swing of the simulated swing arm (9) with the first counterweight block (10) and the second counterweight block (10'), the first displacement sensor (11) is used to measure the position of the first counterweight block (10) when it swings to the lowest point, so as to obtain the positioning accuracy and repeat positioning accuracy of the RV reducer. During the entire life cycle of the RV reducer (6), the wear of the RV reducer (6) are detected in real time. It provides a testing basis for studying the wear law of RV reducer. The precision retaining ability and fatigue life of the RV reducer (6) can be obtained by analyzing a large number of testing data.

The second displacement sensor (15) is placed below the detection rod (14) to measure its height. Firstly, the height of the detection rod (14) is measured without applying counterweight block to the simulated swing arm (9). Then, install the first counterweight block (10) and the second counterweight block (10') to the simulated swing arm (9), and measure the height of the detection rod (14). By comparing the difference between the two heights, the tilt angle of the output planet carrier of the RV reducer (6) can be obtained. Thus, the bending stiffness of the RV reducer (6) can be determined subsequently. By increasing the axial distance between the second displacement sensor (15) and the output planet carrier of the RV reducer (6), the measurement accuracy of the bending stiffness of the RV reducer is improved. This testing method can also determine the tilt angle of the output planet carrier of the RV reducer (6) under different rotational positions and different loads. After the specified time of operation, both the bending stiffness and the wear of RV reducer (6) in the tilt direction are detected in real time, so as to master the wear rule of RV reducer. The temperature sensor (7) is fixed on the pin wheel housing of the RV reducer (6) to measure the working temperature of the RV reducer. Thus, the feasibility of the test conditions and the effectiveness of the test data are confirmed. When the detected temperature is abnormal, the test should be stopped to prevent accidents.

The loaded torque and loaded bending moment can be increased by increasing the working speed of the servo motor (4) and adding the weight of the first counterweight block (10) and the second counterweight block (10'). Without changing the failure mechanism and failure mode, the wear of each part of the RV reducer (6) is accelerated by applying more severe test conditions. Finally, the precision retaining ability and fatigue life of the RV reducer can be detected. The invention serves as a test basis for the theoretical research of accelerated life of RV reducer.

We claim:

1. A testing device for testing the precision retaining ability and fatigue life of RV reducer, comprising a workbench (1), a mounting bracket base (2), a upper pressure plate of a mounting bracket (3), a servo motor (4), a mounting fixed sleeve (5), a tested RV reducer (6), a temperature sensor (7), an extension arm (8), a simulated swing arm (9), two counterweight blocks: a first counterweight block (10) and a second counterweight block (10'), a first displacement sensor (11), a sensor holder (12), a sensor protector (13), a detection rod (14), and a second displacement sensor (15);

the mounting fixed sleeve (5) is used to fix the RV reducer (6) and the servo motor (4); there are threaded holes on both sides of the mounting fixed sleeve (5), one side of the mounting fixed sleeve (5) is connected with the servo motor (4) by bolt, and the other side of the mounting fixed sleeve (5) is connected with the pin wheel housing of the RV reducer (6) by bolt; there is a through hole in a middle portion of the mounting fixed sleeve (5), an output shaft of the servo motor (4) penetrates through the through hole and is connected with an input shaft of the RV reducer (6) through key joint;

the mounting bracket base (2) is fixed on the workbench (1) by bolts, the mounting bracket base (2) is connected with the upper pressure plate of the mounting bracket (3) to form the mounting bracket; the mounting bracket and the mounting fixed sleeve (5) are connected by interference fit, the upper pressure plate of the mounting bracket (3) and the mounting fixed sleeve (5) are provided with positioning holes, the upper pressure plate of the mounting bracket (3) and the mounting fixed sleeve (5) are fastened by bolts through the positioning holes, thus the servo motor (4) and the RV reducer (6) can be installed on the same bracket;

the end of the simulated swing arm (9) is equipped with the two counterweight blocks: the first counterweight block (10) and the second counterweight block (10'), the first counterweight block (10) and the second counterweight block (10') are respectively placed on both sides of the simulated swing arm (9) and fixedly connected with the simulated swing arm (9) through bolt, the two counterweight blocks provide a variable loaded torque and a loaded bending moment to the RV reducer (6); the first displacement sensor (11) is placed below the first counterweight block (10) and is fixedly connected with the sensor holder (12) through bolts; t the sensor protector (13) is placed below the second counterweight block (10') to protect the first displacement sensor (11);

the extension arm (8) is fixedly connected with the detection rod (14) through bolt, and an axis of the extension arm (8) is collinear with an axis of the detection rod (14); the second displacement sensor (15) is placed below the detection rod (14); the extension arm (8) is fixedly connected with an output planet carrier of the RV reducer (6) through bolt, and the axis of the extension arm (8) is collinear with a rotation axis of the output planet carrier of the RV reducer (6); the extension arm (8) is arranged vertically relative to the simulated swing arm (9), and is fixedly connected with the simulated swing arm (9) through bolt.

2. A method of applying the testing device for testing the precision retaining ability and fatigue life of RV reducer according to claim 1, characterized in that: the servo motor (4) drives the RV reducer (6) to rotate, and the output planet carrier of the RV reducer (6) drives the extension arm (8) and the simulated swing arm (9) to swing back and forth; the first displacement sensor (11) is used to measure position information of the first counterweight block (10) when the first counterweight block (10) swings to a lowest point, during entire life cycle of the RV reducer (6), positioning accuracy, repeat positioning accuracy and wear of the RV reducer (6) are measured in real time; then a numerical fitting algorithm is used to calculate the precision retaining ability and fatigue life of the RV reducer (6);

the second displacement sensor (15) is used to measure the height of the detection rod (14), then a tilt angle of the output planet carrier of the RV reducer (6) under different rotational positions and different loads is determined; after a specified time of operation, bending stiffness of the RV reducer (6) and the wear in tilt direction are measured in real time.

3. The method according to claim 2 characterized in increasing rotation speed of the servo motor (4), or increasing weight of the two counterweight blocks 10 and 10', so as to increase the loaded torque and loaded bending moment and accelerate the wear of parts of the RV reducer (6), thus, the precision retaining ability and fatigue life of RV reducer can be tested under more severe conditions.

4. The method according to claim 2 characterized in that: different models of RV reducers can be tested by replacing different mounting fixed sleeves (5) during testing process.

* * * * *